(12) United States Patent
Kawano et al.

(10) Patent No.: US 6,337,773 B1
(45) Date of Patent: Jan. 8, 2002

(54) OPTICAL ELEMENT, JIG FOR HOLDING OPTICAL ELEMENT, AND APPARATUS INCLUDING OPTICAL ELEMENT

(75) Inventors: Kenji Kawano, Tokyo; Tsukasa Uehara, Kawasaki; Seiji Iida, Machida, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/099,146

(22) Filed: Jun. 18, 1998

(30) Foreign Application Priority Data

Jun. 23, 1997 (JP) .............................. 9-181759

(51) Int. Cl.[7] .............................................. G02B 3/00
(52) U.S. Cl. ...................................................... 359/642
(58) Field of Search ................................ 359/819, 811, 359/642, 631

(56) References Cited

U.S. PATENT DOCUMENTS

| | | | | |
|---|---|---|---|---|
| 4,190,621 A | * | 2/1980 | Greshes ........................ | 264/1 |
| 4,474,355 A | * | 10/1984 | Greshes .................... | 249/53 R |
| 4,537,732 A | * | 8/1985 | Ueda et al. .................. | 264/1.1 |
| 4,776,101 A | * | 10/1988 | Ishibai ........................ | 33/551 |
| 5,579,164 A | * | 11/1996 | Chapnik ..................... | 359/618 |
| 5,684,594 A | * | 11/1997 | Platten et al. ............... | 356/363 |
| 5,825,560 A | * | 10/1998 | Ogura et al. ................ | 359/822 |
| 5,917,662 A | * | 6/1999 | Makoto ....................... | 359/729 |

FOREIGN PATENT DOCUMENTS

| | | |
|---|---|---|
| EP | 0 730 169 | 9/1996 |
| EP | 0 730 179 | 9/1996 |
| EP | 0 730 180 | 9/1996 |
| EP | 0 788 003 | 8/1997 |
| EP | 0 790 513 | 8/1997 |
| EP | 0 802 436 | 10/1997 |
| JP | 8-292374 | 11/1996 |
| JP | 9-146002 | 6/1997 |

\* cited by examiner

Primary Examiner—Ricky Mack
(74) Attorney, Agent, or Firm—Fitzpatrick, Cella, Harper & Scinto

(57) ABSTRACT

An optical element is provided that allows accurate measurement of the shapes of the element and its surfaces which light is bound to strike, a jig is provided for holding the optical element, and an apparatus such as an image pickup apparatus or display apparatus is provided which includes the optical element. This optical element is characterized in that it includes surfaces which light is bound to strike and reference portions indicating the reference positions of the shapes of the surfaces, and the reference portions have curved surfaces defining points corresponding to the reference positions.

46 Claims, 9 Drawing Sheets

OPTICAL ELEMENT, JIG FOR HOLDING OPTICAL ELEMENT, AND APPARATUS INCLUDING OPTICAL ELEMENT

BACKGROUND OF THE INVENTION

1. Field of the Invention

The present invention relates to an optical element suitable for an image pickup apparatus such as a video camera, a still video camera, or a copying machine or an image display apparatus such as a head- or face-mounted image display apparatus and, more particularly, to an optical element having a plurality of reflecting surfaces with curvatures. More specifically, the present invention relates to an optical element that allows acquisition of an accurate relative positional relationship between a plurality of reflecting surfaces having curvatures or an accurate relative positional relationship between the respective reflecting surfaces and the overall optical element, which is required to form the respective reflecting surfaces at predetermined positions, within a short period of time, and an apparatus including a holding jig for holding the optical element during a shape measurement process and an apparatus, such as an image pickup apparatus, including the optical element.

2. Related Background Art

With the recent spread of multimedia technology, not only audio/text data but also image data are handled. In general, video cameras and digital cameras are widely used to capture images.

In addition, compact cameras as phototaking means have recently been built in portable terminal apparatuses, such as portable telephones and handy computers, to allow transmission of captured image data through telephone lines immediately after a phototaking operation.

In general, the cameras of these image input apparatuses include unfocal lenses or zoom lenses made up of coaxial lenses suitable for the sizes of the respective image pickup elements.

The image pickup element of the camera of a portable terminal apparatus like the one described above is very small. For this reason, such a camera is often designed to be compact at the cost of the brightness (F-number) of the lens. In addition, there is a tendency toward a low S/N ratio. Consequently, many cameras cannot be used in dark places. Even if they can be used in dark places, images with poor image quality (low S/N ratios) are often obtained.

In addition, since many cameras include fixed focal length lenses, the field angles are always fixed. This causes inconvenience depending on the objects to be phototaken. To obviate such inconvenience, zoom lenses are mounted in these cameras. However, the use of zoom lenses inevitably increases the size of the camera. That is, the zoom lenses pose a problem in terms of portability.

With the recent decrease in the size of an image pickup element and the increase in the integration degree of a circuit system, there has been an increasing tendency toward producing a phototaking circuit unit of small size. And a decrease in the size of a camera has grown in importance.

Conventionally, this type of camera uses coaxial lenses, and hence requires a certain thickness or more in the optical axis direction. In addition, many cameras in this form have wide-angle lenses because of their application purposes. According to the arrangement of such coaxial lenses, the front-element diameter (the diameter of the front lens) is especially large.

It is therefore difficult to reduce the size of the camera as a whole, especially its profile, resulting in limitations on the degree of freedom in the form of a product and portability. This is one of the factors that interfere with the widespread use of such cameras as consumer products.

Under such circumstances, efforts have been made to develop a non-coaxial lens unit. According to this lens unit, a plurality of curved surfaces as reflecting surfaces are integrally formed on the surface of a transparent optical element. Light enters the element through a light incident surface formed by a general refracting surface and is reflected by these reflecting surfaces. Desired optical characteristics are obtained by using the reflection of these reflecting surfaces. For example, such a lens unit is disclosed in Japanese Patent Application Laid-Open No. 8-292372 (EP 0730180A). According to this reference, a plurality of transparent optical elements, each having a plurality of curved surfaces and flat surfaces as reflecting surfaces integrally formed, are used, and the relative positions of at least two optical elements of two or three or more optical elements are properly changed to zoom.

As compared with a coaxial lens unit, the front-element diameter of an optical element in this form can be reduced to reduce its thickness in the light incident direction. Therefore, development and research of such optical elements as promising techniques is urgently pursued.

An optical element of this type uses free curved surfaces (non-rotation-symmetrical aspheric surfaces). Similar to general coaxial lenses, these free curved surfaces demand high molding precisions, i.e., a shape precision of several microns and a surface precision of submicrons. Obviously, to achieve such high molding precisions, mold work must be performed with precision on the submicron order, and a shape measurement technique with precision higher than the work precision is required.

As described above, each free curved surface is formed by polishing because of the requirement of surface precision on the submicron order. To improve workability in polishing, mold pieces for the respective free curved surfaces are separately manufactured.

When, therefore, these mold pieces are assembled into a mold, positional shifts of several microns occur between the respective mold pieces. As a result, relative tilts occur between the reference surfaces forming the respective free curved surfaces.

In consideration of the surface precision required for each free curved surface, the mold must be corrected by measuring the mold or molded product with a three-dimensional measuring device having a resolution of submicrons or less and calculating the tilt amount of each free curved surface.

When the shape of an optical element is measured with this three-dimensional measuring device, measurement references must be set on a holding jig for holding the optical element. In this case, in general, measurement reference surfaces are formed on the outer surface of the holding jig, and the positions of the measurement reference surfaces are measured in a measurement process for the optical element to set reference planes and the origin of an absolute coordinate system. According to such method that sets a measurement reference for an overall optical element in reference to the measurement reference surfaces of the holding jig, the work precision of the holding jig affects the measurement data on the measurement reference surfaces, resulting in low reliability of the measurement data.

SUMMARY OF THE INVENTION

It is an object of the present invention to provide an optical element that allows accurate measurement of the shapes of the element and its surfaces which light is bound to strike, a jig for holding the optical element, and an apparatus such as an image pickup apparatus or display apparatus which includes the optical element.

According to an aspect of the present invention, there is provided an optical element comprising a surface, and a reference portion indicating a reference position of a shape of the surface, the reference portion having a curved surface for defining a point corresponding to the reference position.

According to another aspect of the present invention, there is provided an optical element comprising a surface, and a reference portion indicating a reference position of a shape of the element, the reference portion being a portion to be held when the element is built in an apparatus.

The jig of the present invention is a jig for holding the optical element when the shape of the surface of the element is to be measured. The jig includes a reference portion indicating the reference position of the jig and using one or a plurality (preferably three or more) of steel balls.

The apparatus of the present invention includes the optical element described above. This apparatus is an image pickup apparatus, such as a camera or a heador face-mounted image display apparatus.

As the surface of the optical element, a non-rotation symmetrical aspheric surface is formed as a reflecting surface on the surface of a transparent medium. This reflecting surface reflects light propagating in the transparent medium. A thin element with high optical performance can be obtained by forming a plurality of surfaces of this type.

DESCRIPTION OF THE PREFERRED EMBODIMENTS

Figure 1:
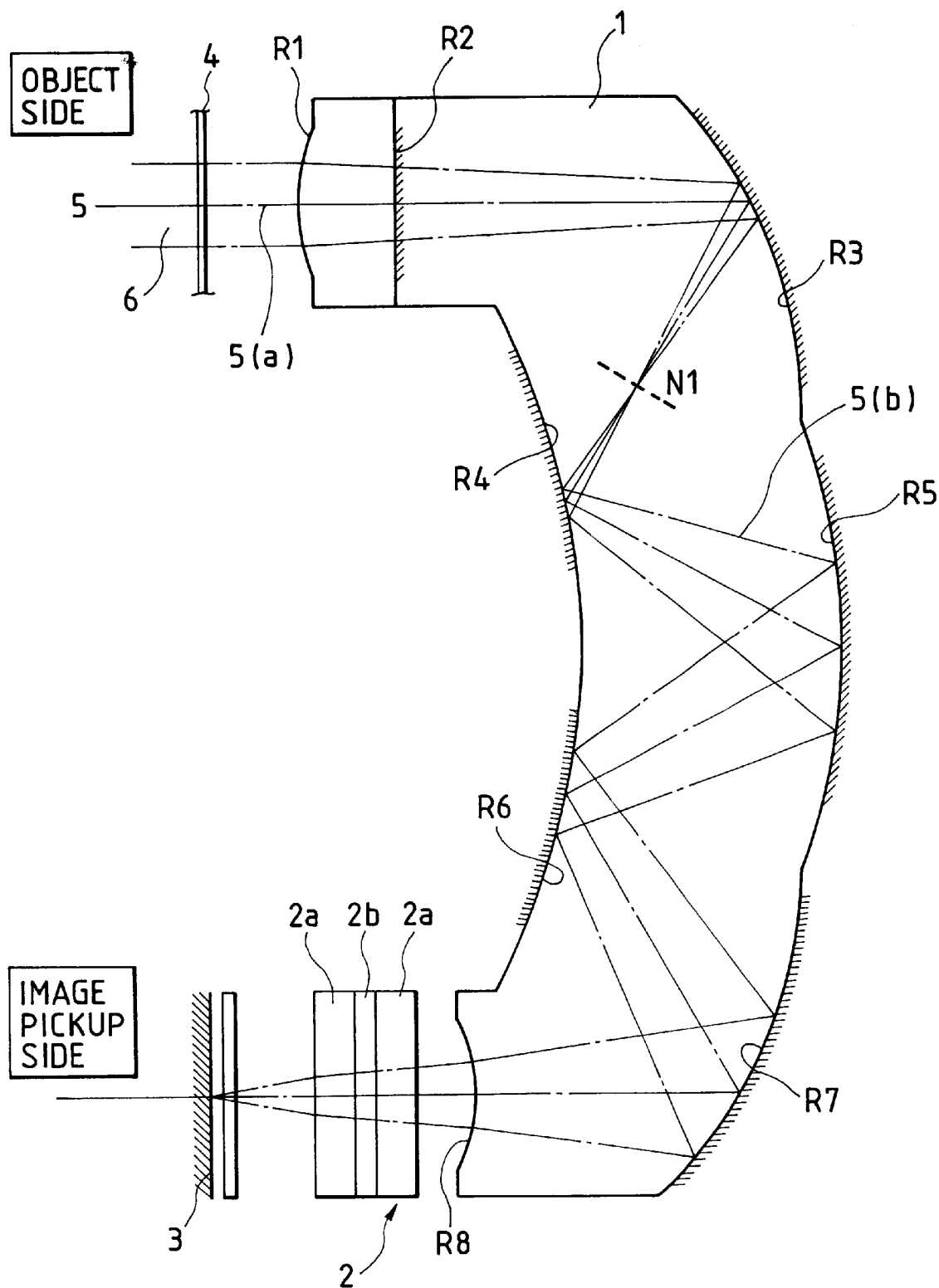
FIG. 1 is a sectional view of the optical path of an optical element according to the first embodiment.

FIG. 1 is a sectional view of an optical path for an optical element according to the first embodiment of the present invention. This optical element is formed by forming two refracting surfaces and a plurality of reflecting surfaces having curvatures on the surfaces of a transparent member, and also integrally forming two flange portions on portions of the outer surface of the transparent member. The optical element is used for an image pickup apparatus such as a video camera, a still video camera, or a copying machine. As shown in FIG. 1, an optical element 1 in this embodiment comprises a convex lens R1 serving as a light-incident surface forming one refracting surface, a plane mirror R2, a concave mirror R3 forming a reflecting surface having a curvature, a convex mirror R4, a concave mirror R5, a convex mirror R6, a concave mirror R7, and a concave lens R8 serving as a light exit surface forming the other refracting surface (the reflecting surfaces are indicated by the hatched portions in FIG. 1, and the plane mirror R2 is shown in the same plane as that of a reference axis 5(b) in this sectional view of the optical path for the sake of convenience, although the reference axis of the plane mirror R2 is bent through 90° (as will be described later)). These lenses and mirrors are arranged from the object side in the order named.

Figure 2A:
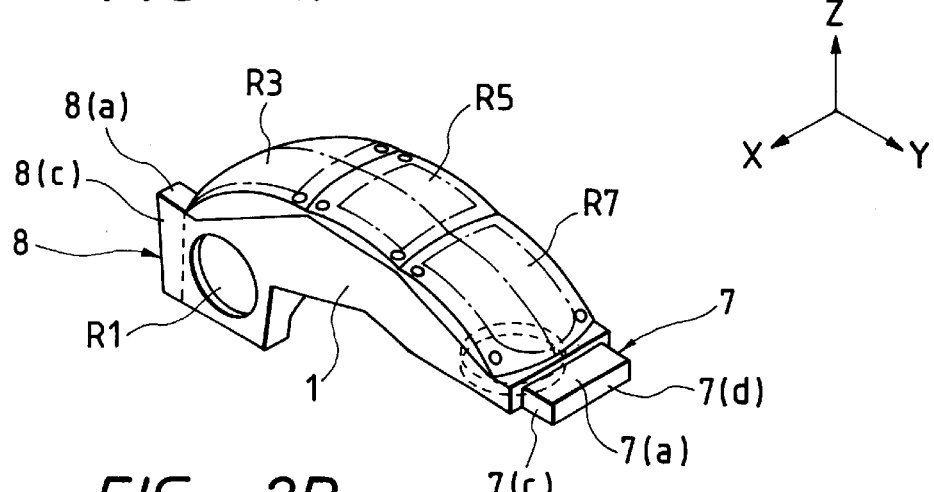
FIGS. 2A, 2B and 2C are perspective views of the optical element according to the first embodiment.
Figure 2B:
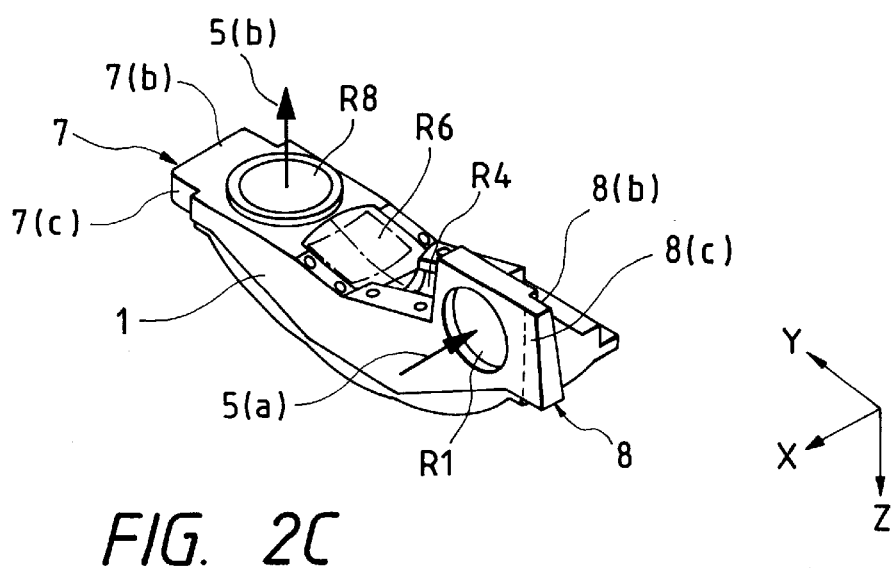
Figure 2C:
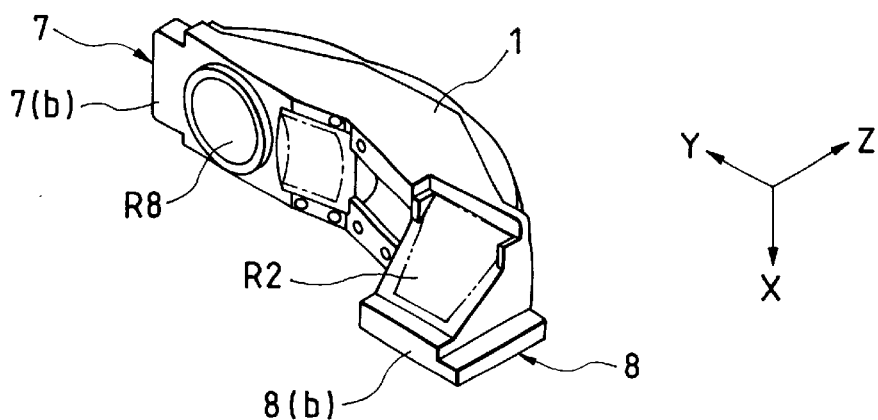

In this case, as shown in the perspective views of FIGS. 2A to 2C, the axis of the convex lens R1 tilts at 90° (intersects at right angles) with respect to the reference axis 5(b) of the elements ranging from the concave mirror R3 to the concave lens R8 through the plane mirror R2. An optical correction plate 2 is constructed by a pair of quartz low-pass filters 2a placed on two sides to cause birefringence in the horizontal and vertical directions, respectively, and an infrared cut filter 2b placed between the quartz low-pass filters 2a. The optical element 1 also includes a light-receiving surface 3 of an image pickup element such as a CCD, a stop 4 placed on the object side of the optical element 1, a reference axis 5 of the phototaking optical system, and a reference axis 5(a) of the convex lens R1 and the plane mirror R2. The reference axis 5(b) of the elements ranging from the concave mirror R3 to the concave lens R8 is perpendicular to the reference axis 5(a), as shown in FIG. 2B.

Imaging by the elements in this embodiment will be described next.

As shown in FIG. 1, the amount of light 6 coming from the object is limited by the stop 4. The light becomes incident on the convex lens R1 as the light incident surface of the transparent optical element 1. The object light 6 incident on the convex lens R1 goes into the optical element 1 and is reflected by the plane mirror R2 and bent at 90°. The light then reaches the concave mirror R3. The object light 6 reflected by the concave mirror R3 forms a primary object image on an intermediate imaging plane N1 owing to the power of the convex lens R1.

By forming the object image in the optical element 1 in such an early stage, an increase in the effective diameter of a light beam on the light-receiving surface 3 is suppressed.

After forming a primary image on the intermediate imaging plane N1, the object light 6 is sequentially reflected by the effective light beam reflecting regions (to be described later) of the convex mirror R4, the concave mirror R5, the convex mirror R6, and the concave mirror R7, which serve as reflecting surfaces, and is refracted by the concave lens R8 serving as a light-exit surface. As a result, the object light is formed into an image on the light-receiving surface 3 while the light is influenced by the power of the five reflecting mirrors and the power of the two refracting lenses.

As described above, refractions at the light incident and exit positions and reflections by the respective reflecting mirrors placed between the light incident and exit positions and having curvatures make the optical element 1 serve as a lens unit having a positive power and a desired optical performance.

FIGS. 2A to 2C are perspective views showing the optical element 1 viewed in different directions.

FIG. 2A is a perspective view showing the optical element viewed from the direction in which the light incident surface R1 and the reflecting surfaces R3, R5, and R7 can be observed. FIG. 2B is a perspective view showing the optical element viewed from the direction in which the light incident surface R1 and the reflecting surfaces R4 and R6 can be observed. FIG. 2C is a perspective view showing the optical element in which the light-exit surface R8 and the plane mirror R2 for bending the optical path of the object light 6 at 90° can be observed. FIGS. 2A to 2C also show the X, Y, and Z directions in the absolute coordinate system of the optical element 1.

The optical element 1 of this embodiment shown in FIGS. 2A to 2C is formed by molding. The interior of the optical element 1, which serves as an optical path, is filled with a resin. In addition, aluminum or silver reflecting films are formed on the respective reflecting surfaces R3 to R7 by vapor deposition or sputtering, which is a dry film formation technique, set plating, or the like. Transmittance-increasing films (antireflection films) for increasing transmittance are formed on the surfaces of the refracting lenses of the light incident and exit surfaces R1 and RB.

The optical element 1 has an arcuated shape as a whole. A flange portion 7 serving as a shape-measurement reference surface for the overall optical element 1 is formed near the surface of the concave lens R8 on the light exit side of the optical element 1.

The flange portion 7 has a flat portion 7(c) parallel to a plane (Y-Z plane) including the reference axis 5(b), and flat portions 7(a), 7(b), and 7(d) perpendicular to the flat portion 7(c). In this embodiment, of the flat portions 7(a) to 7(c), the flat portions 7(a), 7(c), and 7(d) serve as reference surfaces for shape measurement. The reference surfaces 7(a), 7(c), and 7(d) of the flange portion 7 are also used when the optical element 1 is held in a lens barrel (not shown).

A flange portion 8 is also formed near the convex lens R1 on the light incident side. This flange portion 8 has a flat portion 8(c) parallel to the above plane including the reference axis 5(b), and flat portions 8(a) and 8(b) perpendicular to the flat portion 8(c). In this embodiment, of the flat portions 8(a) to 8(c), the flat portions 8(a) and 8(c) serve as reference surfaces for shape measurement. These flat portions 8(a) and 8(c) serve as reference surfaces for shape measurement and are used when the optical element 1 is held in a lens barrel (not shown).

Figure 3:
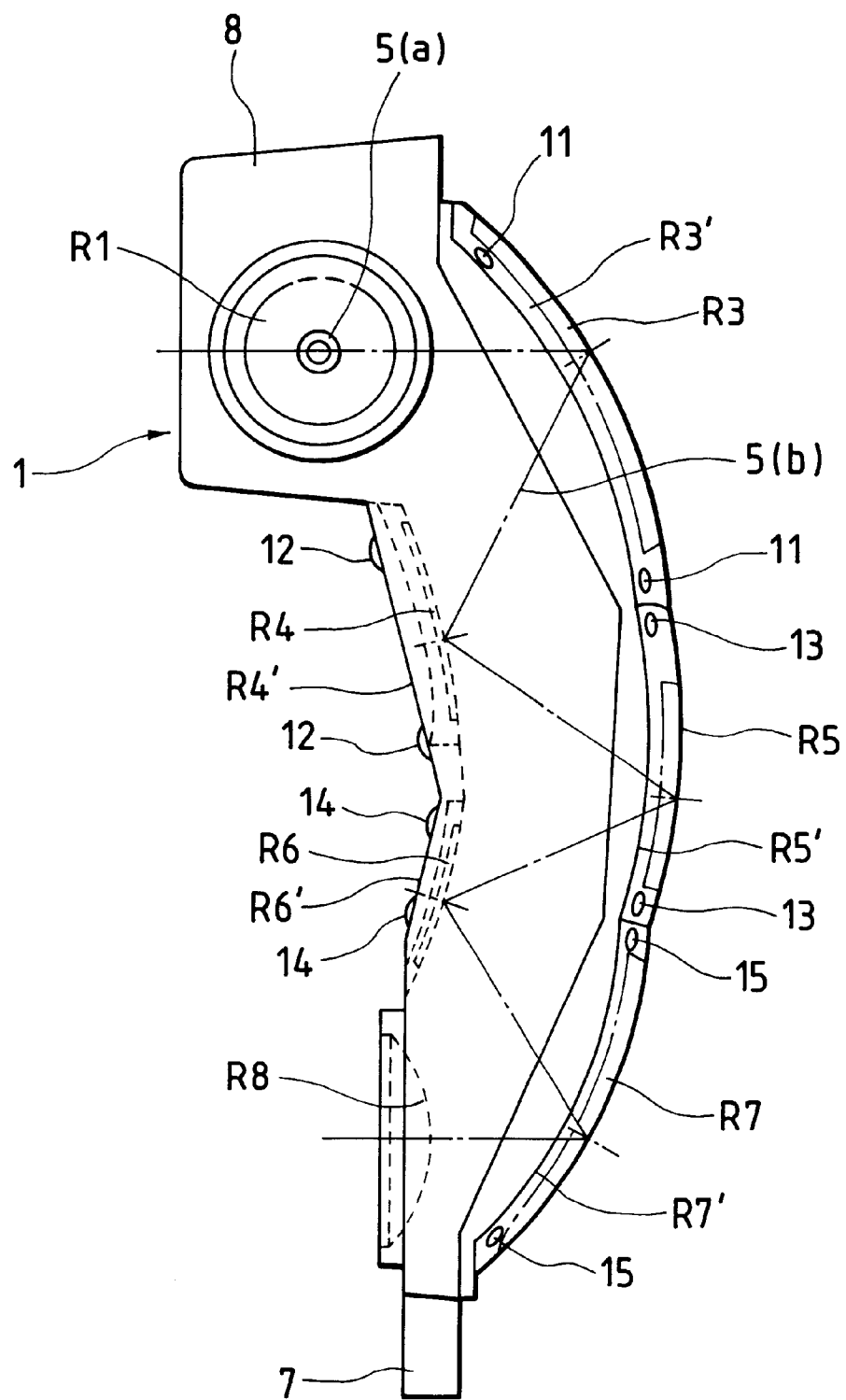
FIG. 3 is a view of the optical element according to the first embodiment viewed from the incident surface side.
Figure 4:
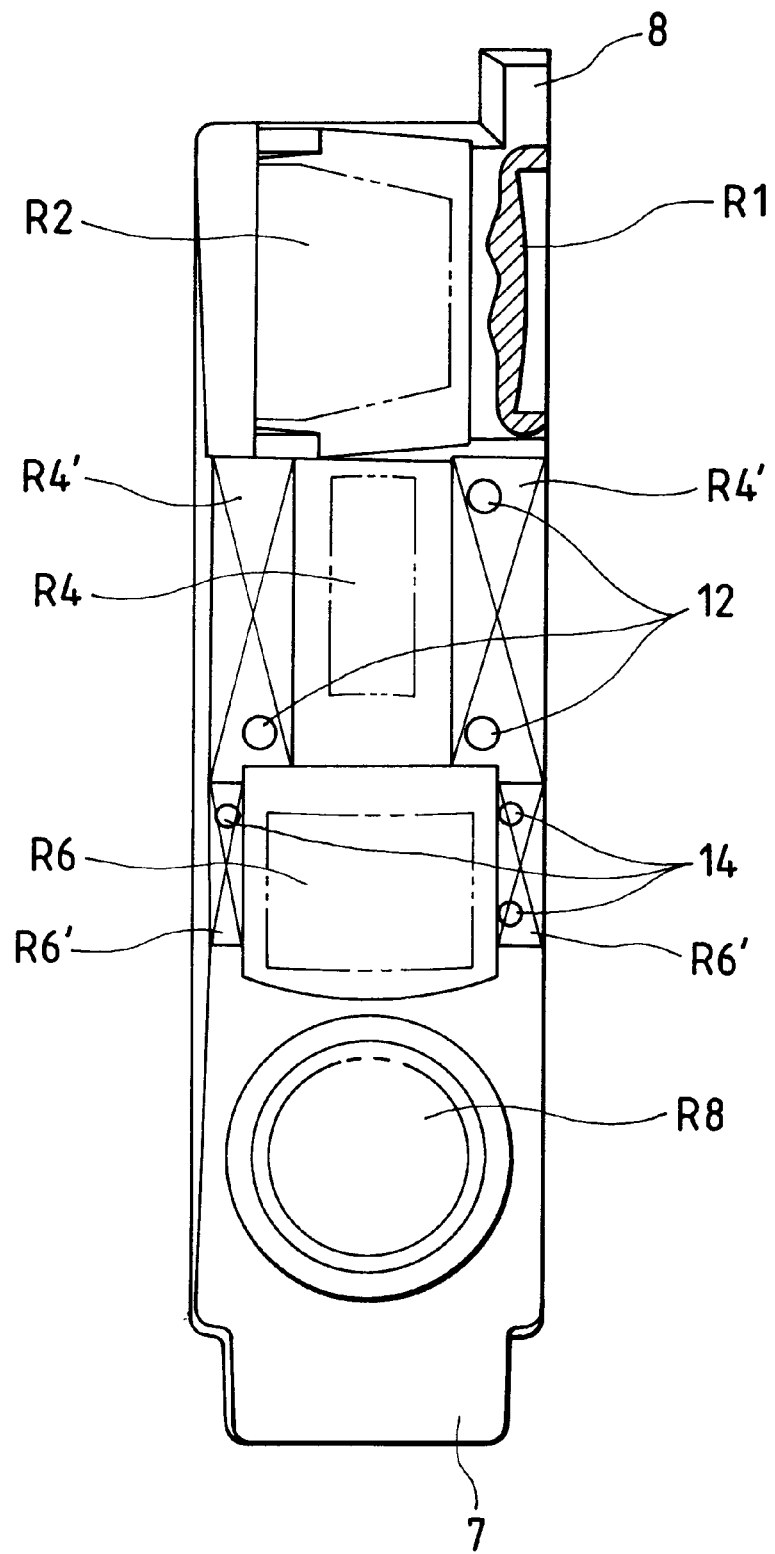
FIG. 4 is a view of the optical element according to the first embodiment viewed from the convex reflecting surface/refracting surface side.
Figure 5:
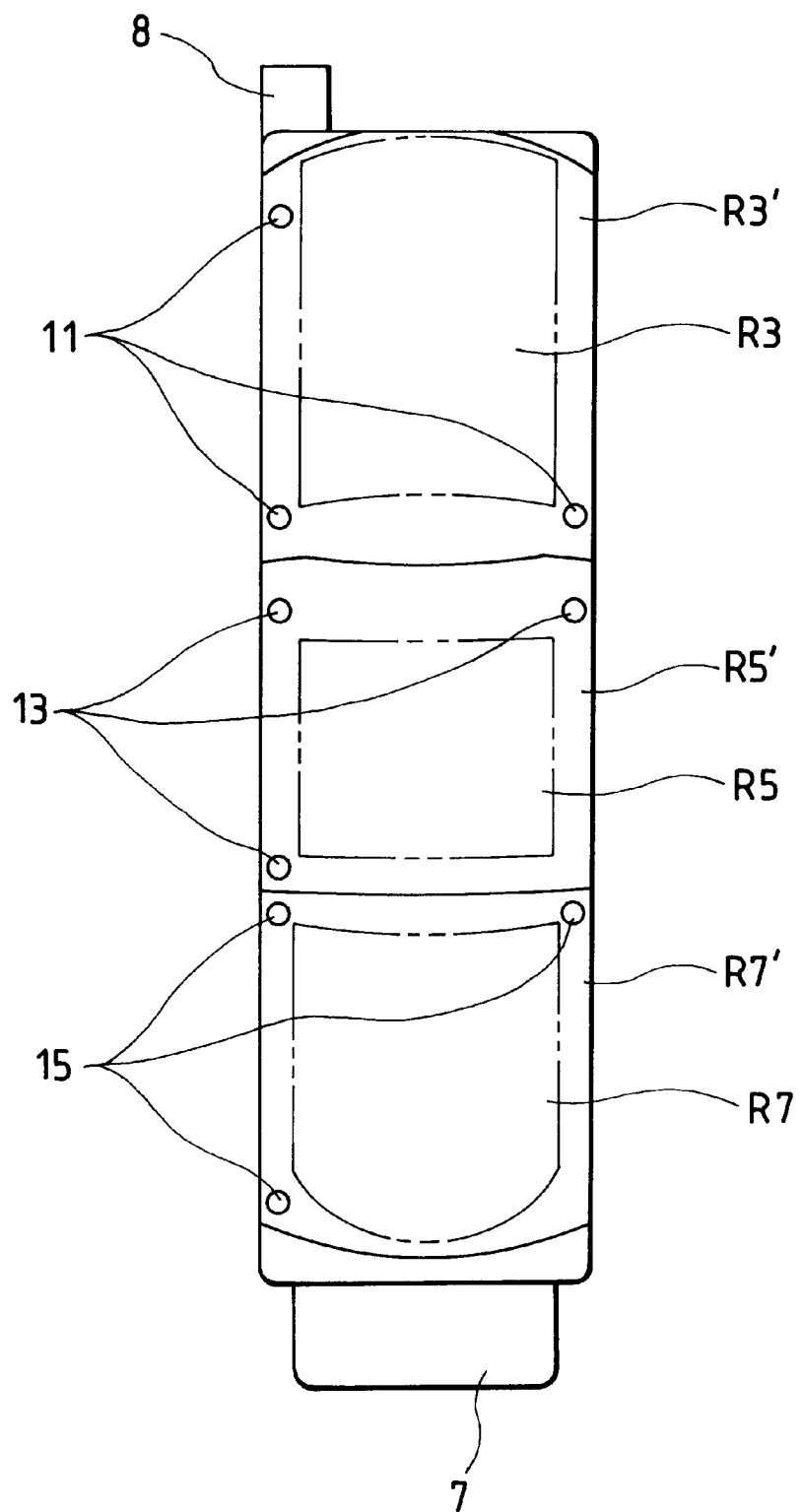
FIG. 5 is a view of the optical element according to the first embodiment viewed from the concave reflecting surface side.

FIGS. 3 to 5 are views showing the optical element 1 in FIG. 1 viewed from different surface sides.

FIG. 3 shows the optical element 1 observed from the light-incident surface R1 side. FIG. 4 shows the optical element 1 observed from the reflecting surface R4/R6 side. FIG. 5 shows the optical element 1 observed from the reflecting surface R3/R5/R7 side.

Referring to FIG. 4, flat portions R4' are formed on the two sides (peripheral portions) of the effective light-beam-reflecting region (indicated by the chain double-dashed line in FIG. 4) of the reflecting surface R4. Three projections 12 serving as shape measurement references for the reflecting surface R4 are formed inside the flat portions R4'.

Each projection 12 has a spherical distal end (see FIG. 3). When the shape of the reflecting surface R4 is to be measured, the spherical shape of each projection 12 is measured, and the center position is calculated to virtually obtain a reference position, thereby obtaining a reference plane and a local origin with respect to the reflecting surface R4. To set a reference plane, at least three projections must be formed as in this embodiment. The formation precision of each spherical shape in this case is preferably about $\frac{1}{10}$ or less the allowable relative position precision of the respective reflecting surfaces.

Similarly, flat portions R6' are formed on the two sides (peripheral portions) of the effective light-beam reflecting region (indicated by the chain double-dashed line in FIG. 4) of the reflecting surface R6. Three projections 14 serving as shape measurement references for the reflecting surface R6 are formed inside the flat portions R6'.

Each projection 14 has a spherical distal end (see FIG. 3). When the shape of the reflecting surface R6 is to be measured, the spherical shape of each projection 14 is measured, and the center position is calculated to virtually obtain a reference position, thereby obtaining a reference plane and a local origin with respect to the reflecting surface R6. To set a reference plane, at least three projections must be formed as in this embodiment. The formation precision of each spherical shape in this case is preferably about $\frac{1}{10}$ or less the allowable relative position precision of the respective reflecting surfaces.

As shown in FIG. 3, since the concave surface of the concave lens R8 serving as the light exit surface is spherical, its center position can be determined by measuring the surface shape without forming any projections for measurement. In this case as well, the shape precision of the concave lens is preferably about $\frac{1}{10}$ or less the allowable relative position precision of the respective reflecting surfaces. Although the concave lens R8 is spherical in this embodiment, the same applies to even a case in which the concave lens R8 has an aspheric shape, that is, it is rotation-symmetrical about the reference axis 5(b). Assume that the concave lens R8 has a non-rotation-symmetrical, free-curved surface shape. Obviously, in this case, three reference projections having spherical surfaces like the projections 12 (or 14) are formed near the concave lens to set a reference position and a local origin, thereby measuring the lens shape.

Referring to FIG. 5, similar to the reflecting surfaces R4 and R6 described above, three projections (first reference portions) 11 serving as references for the measurement of the shape of the reflecting surface R3 are formed on two ends of a peripheral portion R3' outside the effective light beam reflecting region (indicated by the chain double-dashed line in FIG. 5) of the reflecting surface R3. In this case, unlike the reflecting surfaces R4 and R6, the projections 11 are formed on the extended-free-curved-surface portion of the reflecting surface R3 without forming any flat portions on the peripheral portion of the reflecting surface R3.

Each projection 11 has a spherical distal end (see FIG. 3). When the shape of the reflecting surface R3 is to be measured, the spherical shape of each projection 12 is measured, and the center position is calculated to virtually obtain a reference position, thereby obtaining a reference plane and a local origin with respect to the reflecting surface R3. To set a reference plane, at least three projections must be formed as in this embodiment. The formation precision of each spherical shape in this case is preferably about $\frac{1}{10}$ or less the allowable relative position precision of the respective reflecting surfaces.

Similarly, three projections 13 serving as references for the measurement of the shape of the reflecting surface R5 are formed on two ends of a peripheral portion R5' outside the effective light beam reflecting region (indicated by the chain double-dashed line in FIG. 5) of the reflecting surface R5. In this case as well, the projections 13 are formed on the extended free-curved-surface portion of the reflecting surface R5 without forming any flat portions on the peripheral portion of the reflecting surface R5.

Each projection 13 has a spherical distal end (see FIG. 3). When the shape of the reflecting surface R5 is to be measured, the spherical shape of each projection 12 is measured, and the center position is calculated to virtually obtain a reference position, thereby obtaining a reference plane and a local origin with respect to the reflecting surface R5. To set a reference plane, at least three projections must be formed as in this embodiment. The formation precision of each spherical shape in this case is preferably about 1/10 or less the allowable relative position precision of the respective reflecting surfaces.

Similarly, three projections 15 serving as references for the measurement of the shape of the reflecting surface R7 are formed on two ends of a peripheral portion R7' outside the effective light beam reflecting region (indicated by the chain double-dashed line in FIG. 5) of the reflecting surface R7. In this case as well, the projections 15 are formed on the extended-free-curved-surface portion of the reflecting surface R7 without forming any flat portions on the peripheral portion of the reflecting surface R7.

Each projection 15 has a spherical distal end (see FIG. 3). When the shape of the reflecting surface R7 is to be measured, the spherical shape of each projection 12 is measured, and the center position is calculated to virtually obtain a reference position, thereby obtaining a reference plane and a local origin with respect to the reflecting surface R7. To set a reference plane, at least three projections must be formed as in this embodiment. The formation precision of each spherical shape in this case is preferably about 1/10 or less the allowable relative position precision of the respective reflecting surfaces.

As described above, in this embodiment, the projections 11 to 15 having spherical surfaces and formed outside the effective-light-beam-reflecting regions of the reflecting surfaces R3 to R7 respectively serve as the first references for defining the reference positions of the reflecting surfaces R3 to R7 when the shape of the optical element 1 is to be measured.

A procedure for measuring the shape of the optical element 1 will be described next with reference FIGS. 6A to 6C.

Figure 6A:
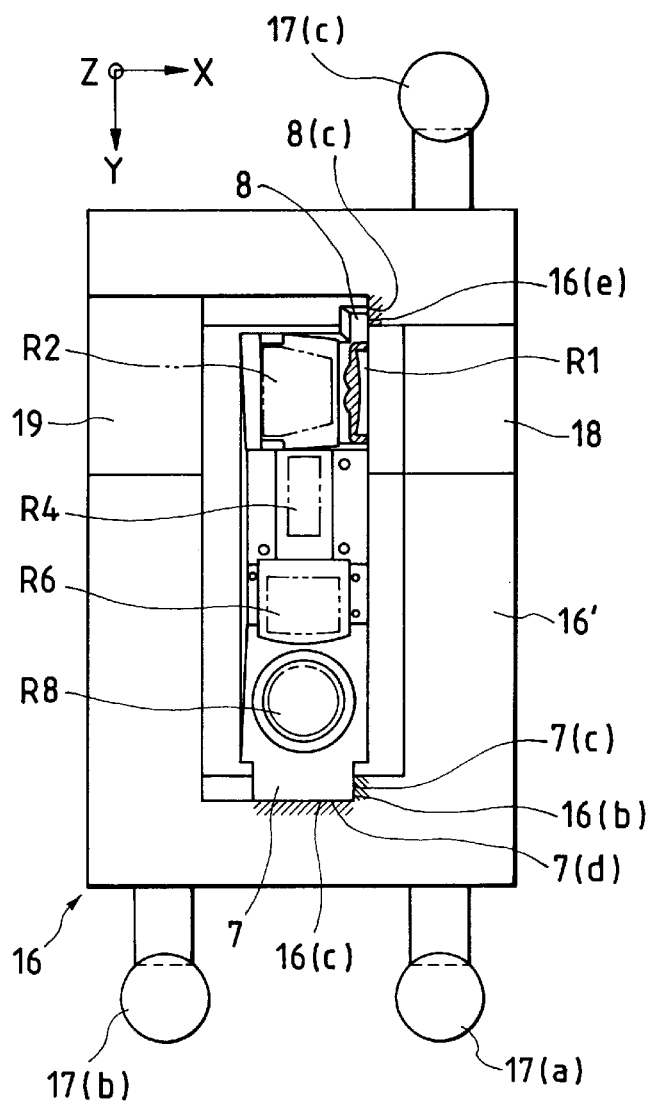
FIGS. 6A, 6B and 6C are schematic views showing a state in which the optical element according to the first embodiment is mounted on a holding jig.
Figure 6B:
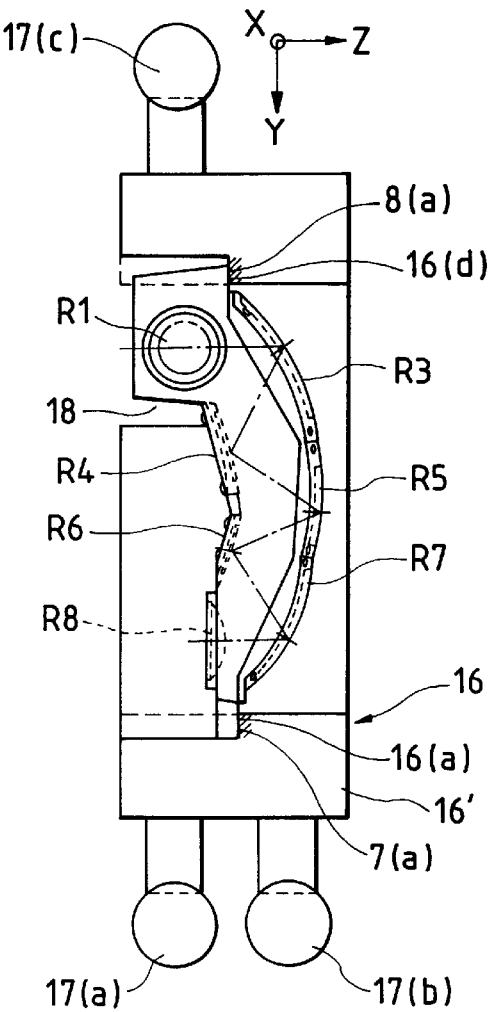

FIGS. 6A and 6B show a state in which the optical element 1 is mounted on a holding jig 16. FIG. 6A shows a view in the direction in which the reflecting surfaces R4 and R6 can be observed. FIG. 6B is a view in the direction in which the convex lens R1 can be observed. FIG. 6C is a view in the direction in which the reference axes 5($a$) and 5($b$) of the optical element 1 can be observed. FIGS. 6A to 6C show the X, Y, and Z directions in the absolute coordinate system of the optical element 1.

Figure 6C:
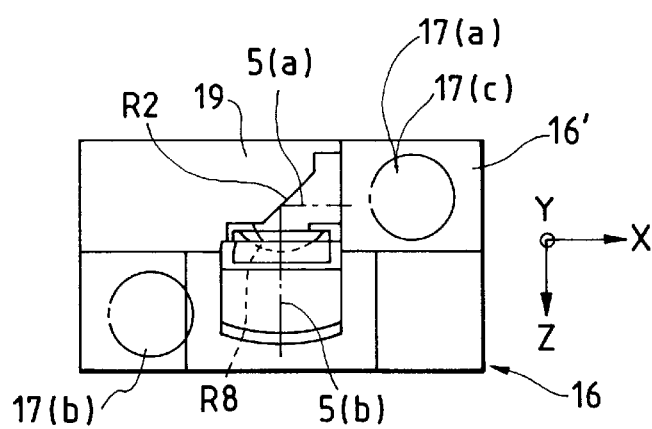

Referring to FIGS. 6A to 6C, the holding jig 16 has reference surfaces 16($a$), 16($b$), 16($c$), 16($d$), and 16($e$) corresponding to the reference surfaces 7($a$), 7($c$), 7($d$), 8($a$), and 8($c$) for the measurement of the shape of the optical element 1. Three steel balls 17($a$), 17($b$), and 17($c$) serving as references for the holding jig 16 are formed on the peripheral portion of the holding jig 16. The shape of each steel ball is measured to virtually calculate the center position of the ball, thereby obtaining a reference plane and the origin of an absolute coordinate system.

In general, a dominant three-dimensional measuring device performs measurement in the vertical direction while moving a contact in the horizontal direction. When the respective surfaces as the surfaces to be measured of the optical element 1 of this embodiment, which has the above shape, i.e., the reflecting surfaces R3 to R8 and the exit surface R8, are to be measured, the surfaces R3 to R8 must be exposed to the upper side in the vertical surface by reversing the holding jig 16 on which the optical element 1 is mounted.

In this embodiment, the holding jig 16 has exposed surfaces corresponding to the reflecting surfaces R3 to R7 and the concave lens R8 as the surfaces to be measured of the optical element 1. The contact of the three-dimensional measuring device (not shown) can be brought into contact with the target surfaces. In addition, notched portions 18 and 19 are formed in the holding jig 16, and the contact of the three-dimensional measuring device can be brought into contact with the convex lens R1 and the plane mirror R2.

In general, measurement-reference surfaces are formed on the surface of the holding jig 16, and the measurement-reference surfaces are measured by the three-dimensional measuring device to measure a reference plane and the origin of an absolute coordinate system. However, since a slight mount error is generated within the process limit range due to reversal of the holding jig 16, the measurement data may deteriorate in reliability owing to such reversal.

In this embodiment, therefore, as shown in FIGS. 6A to 6C, the three steel balls 17($a$), 17($b$), and 17($c$) are mounted on the peripheral portion of a holding jig body 16' with an adhesive or the like. These three steel balls 17($a$), 17($b$), and 17($c$) are positioned with respect to the reflecting surfaces R3 to R7 and the concave lens R8 as the to-be-measured surfaces of the optical element 1 such that the three steel balls can always come into contact with the contact of the three-dimensional measuring device. In other words, the to-be-measured surfaces (the reflecting surfaces R3 to R7 and the concave lens R8) of the optical element 1 are not positioned perpendicularly with respect to the reference plane of the holding jig 16 which is measured with the three steel balls 17($a$), 17($b$), and 17($c$).

Since a steel ball with very high spherical degree and diameter precision can be obtained by polishing, the holding jig 16 can be manufactured at a relatively low cost. This embodiment uses the steel balls 17($a$), 17($b$), and 17($c$) with a spherical degree precision of 0.05 $\mu$m and a diameter precision of 1 $\mu$m.

With this structure, even if the holding jig 16 is reversed or moved, the measurement-reference surface of the holding jig 16 and the origin of the absolute coordinate system can always be set with high precision by measuring the three steel balls 17($a$), 17($b$), and 17($c$).

A molding process for the optical element 1 of this embodiment and the manner of processing measurement data for the element will be described next.

The optical element 1 of this embodiment is formed by injection molding, using low-moisture-absorption PMMA as a molding material, which has excellent optical characteristics and high environmental resistance. The respective reflecting surfaces R3 to R7 of the optical element 1 have free-curved surfaces (non-rotation-symmetrical aspheric surfaces). These reflecting surfaces demand high molding precision, similar to general coaxial lenses, i.e., several microns in shape precision and submicrons in surface precision. To realize such high molding precision, the mold must be worked with precision of submicrons or less, and a shape measuring technique with higher precision is required.

Since surface precision of submicrons is required for the respective free curved surfaces (reflecting surfaces R3 to R7) of the optical element 1 of this embodiment, as described above, polishing is done. To improve the workability in polishing, the mold is assembled by mold pieces for the respective free-curved surfaces.

When, therefore, these mold pieces are assembled into a mold, positional shifts of several microns occur between the respective mold pieces. As a result, relative tilts occur between the reference surfaces forming the respective free-curved surfaces.

For this reason, the tilt amount of each free-curved surface must be calculated by measuring the mold or molded product, thereby correcting the mold.

A three-dimensional measuring device with a resolution of submicrons or less is used to measure the mold or molded product in consideration of the surface precision required for each free curved surface. In many instances, however, measurement data is not continuous data ("continuous" from a macroscopic viewpoint; since data is digitally sampled in the measurement process, the resultant data is basically a set of point data, which is discontinuous) because of foreign substances adhering to the target surfaces in the measurement process, flows/dents on the surfaces, the surface roughness, and the like.

Such components generally become high-frequency components with respect to the continuous data of the free curved surfaces, and are superimposed on the measurement data.

The measurement data is therefore filtered by a low-pass filter to remove the above unwanted high-frequency components, thereby purifying the data. Since the purified data is a set of point data, the data must be mapped/interpolated into continuous surface data. To this end, the purified data is subjected to data interpolation using the least squares method to calculate the surface tilt correction amount in conformity with the design data (continuous surface data). This process will be referred to as fitting hereinafter.

Figure 7:
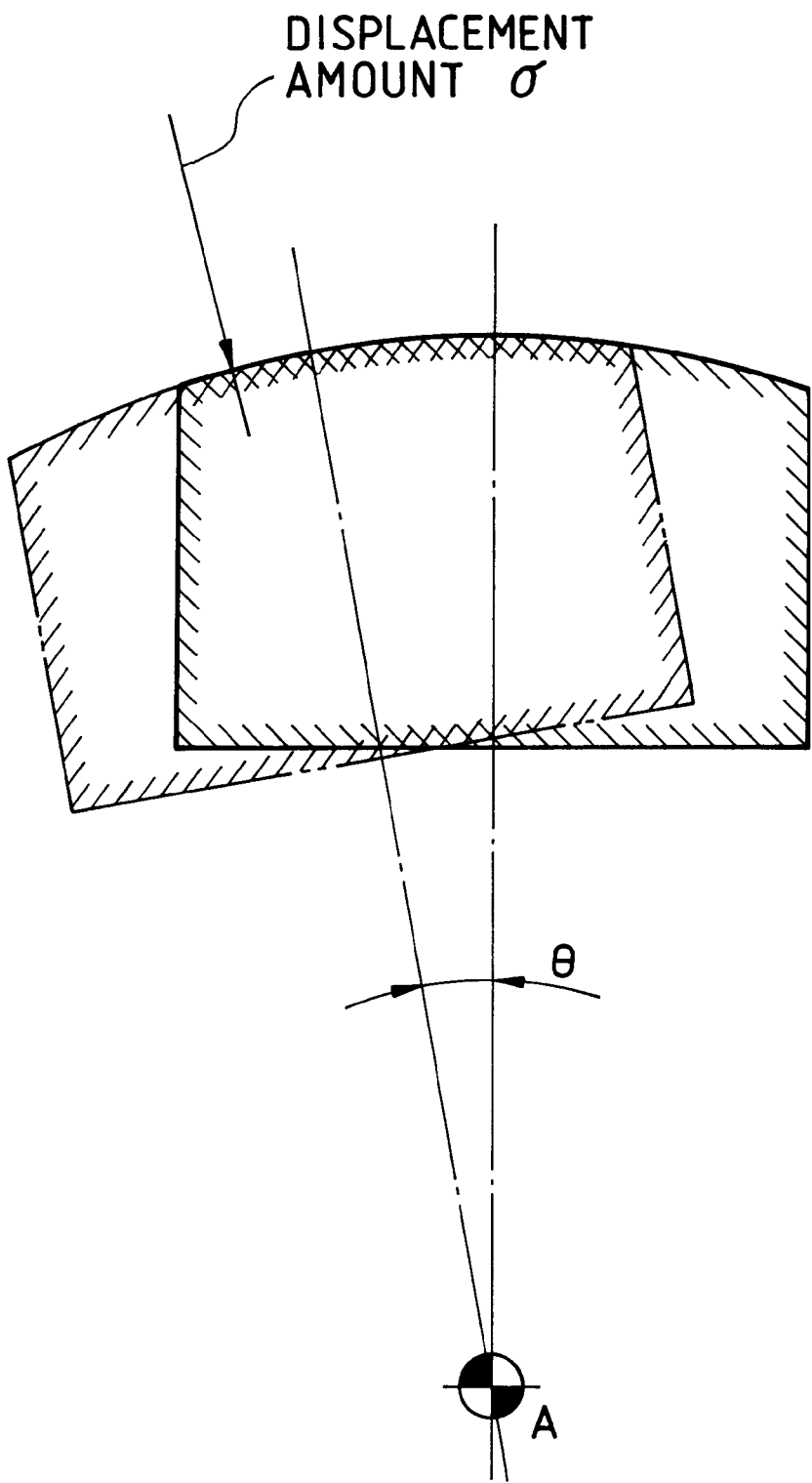
FIG. 7 is a view for explaining the relationship between the change in the curvature of a reflecting surface of the optical element according to the first embodiment and the tilt correction amount.

Assume that the curvature change of a free-curved surface is very small, and the surface shape is close to a spherical shape, as shown in FIG. 7. In this case, even if this surface rotates about a point A that is the center of a pseudo-spherical surface, since a displacement amount δ is small, the reliability of the tilt correction amount (angle θ) may greatly deteriorate.

Although the measurement data is filtered by the low-pass filter to remove unwanted high-frequency components as described above, low-frequency components produced upon vibrations or the like of a room as a measurement environment may mix with the measurement data. As a result, components different from the actual free-curved surface data may be included in the measurement data.

In this case, tilt correction cannot be performed either even if fitting is performed. This makes it difficult to calculate the shape of a free-curved surface.

In this embodiment, therefore, as described above, the relative positional relationship between the respective free-curved surfaces (reflecting surfaces R3 to R7) is obtained in advance by measuring the shape measurement references formed outside the effective light beam reflecting regions of the respective free curved surfaces, i.e., the projections 11 to 15 on the respective reflecting surfaces R3 to R7, thereby accurately calculating the tilt correction amounts for the respective surfaces. Fitting is then performed in consideration of the calculated amounts to improve the fitting precision.

As described above, in this embodiment, the tilt correction amounts for the respective reflecting surfaces R3 to R7 are calculated by measuring the projections 11 to 15 for defining the reference positions of the reflecting surfaces R3 to R7. This prevents foreign substances adhering to the free-curved surfaces, flows/dents on the surfaces, the surface roughness, and the like from affecting the measurement data in the measurement process, and also prevents low-frequency components due to vibrations and the like of a room, as a measurement environment, from mixing with the measurement data. The relative positional relationship between the reflecting surfaces R3 to R7 can be obtained within a short period of time with high precision.

In this embodiment, the projections 11 to 15 as the shape-measurement references are formed outside the effective light beam reflecting regions of the respective free-curved surfaces (reflecting surfaces R3 to R7). However, such projections need not be formed on all the free-curved surfaces, and projections as shape-measurement references can be shared among the respective reflecting surfaces. For a shape that can be molded using an integral mold without the necessity to divide the mold into pieces in working the mold, this structure is very advantageous in terms of the time required for the mold work and ease of measurement.

In this embodiment, the projections are used as the shape-measurement references formed on the respective free curved surfaces (reflecting surfaces R3 to R7) of the optical element 1. Obviously, however, the same effect as described above can be obtained with spherical recesses.

When spherical projections are formed, the contact of the three-dimensional measuring device can be easily brought into contact with each projection in a measurement process, and the mold is cut in the mold work to improve workability. In contrast to this, when spherical recesses are formed, since the resultant structure has no projections, a compact optical element can be obtained.

In this embodiment, the shape-measurement references are spherical. However, the present invention is not limited to spherical references, and an optimal shape may be selected depending on the measuring device to be used to measure an object to be measured.

For example, conical projections or recesses may be formed, and their distal-end portions may be optically detected. That is, any structure can be used as long as points can be defined.

Furthermore, in this embodiment, the optical element is formed by injection molding using a resin. However, as a material for an optical part, not only a resin having excellent optical characteristics, typified by PMMA or the like, but also a glass material having excellent optical characteristics may be used and glass molding may be performed.

FIGS. 8A to 8C and FIGS. 9A and 9B show an optical element according to the second embodiment of the present invention. An optical element 51 of this embodiment is the same as the optical element 1 of the first embodiment in the shapes and positions of the respective surfaces. The optical elements 1 and 51 differ only in the shapes of the flange portions. Since the cross-sectional view of the optical path in FIG. 1 equally applies to the optical element 51, a description thereof will be omitted.

Figure 8A:
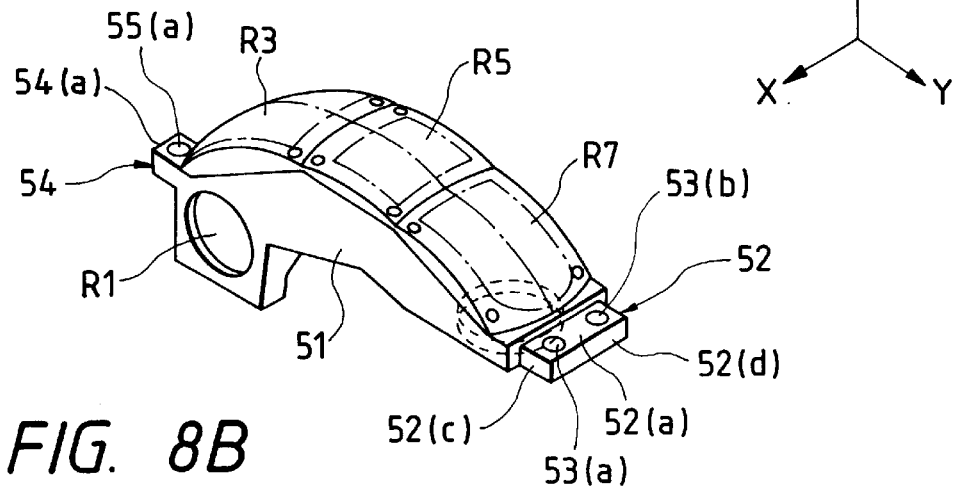
FIGS. 8A, 8B and 8C are schematic views showing a state in which an optical element according to the second embodiment is mounted on a holding jig.
Figure 8B:
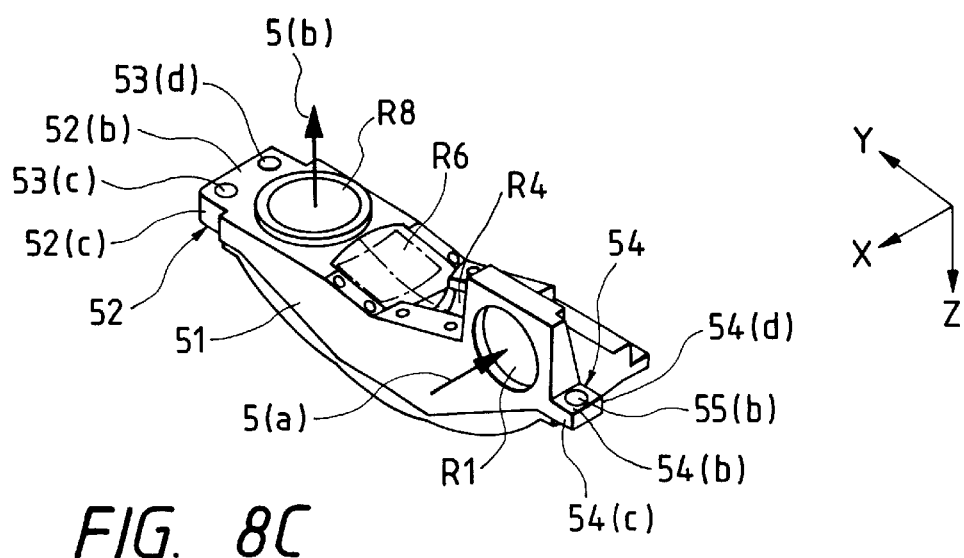
Figure 8C:
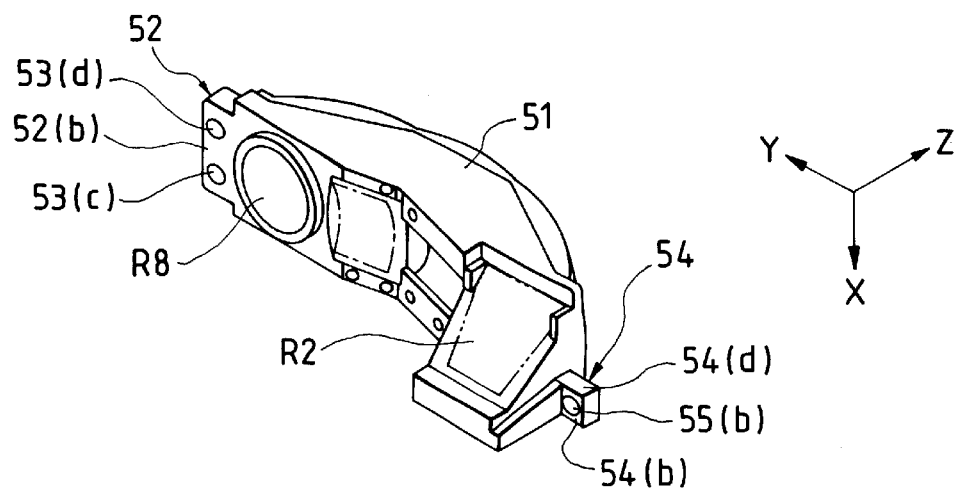

FIGS. 8A to 8C are perspective views of the optical element 51 of this embodiment viewed from different directions. FIG. 8A is a perspective view of the optical element viewed from the direction in which a light incident surface R1 and reflecting surfaces R3, R5, and R7 can be observed. FIG. 8B is a perspective view of the optical element viewed from the direction in which light incident surface R1 and reflecting surfaces R4 and R6 can be observed. FIG. 8C is a perspective view of the optical element viewed from the direction in which a light exit surface R8 and a plane mirror R2 for bending the optical path of object light 6 through 90° can be observed. FIGS. 8A to 8C also show the X, Y, and Z directions in the absolute coordinate system of the optical element 51.

As shown in FIGS. 8A to 8C, the optical element 51 has an arcuated shape as a whole. A flange portion 52 serving as a shape-measurement reference surface for the overall optical element 51 is formed near the surface of the concave lens R8 on the light exit side of the optical element 51.

The flange portion 52 has a flat portion 52(c) parallel to a plane (Y-Z plane) including a reference axis 5(b), and flat portions 52(a), 52(b), and 52(d) perpendicular to the flat portion 52(c). Two projections 53 (53(a) and 53(b) in FIG. 8A) serving as second reference portions are formed on the flat portion 52(a). The projections 53(a) and 53(b) have spherical distal end portions and serve as references for the absolute coordinate system of the optical element 51 when the reflecting surfaces R3, R5, and R7 are measured.

In like manner, two projections 53(c) and 53(d) serving as second reference portions are formed on the flat portion 52(b) on the reverse side of the flange 52. These projections 53(c) and 53(d) serve as references for the absolute coordinate system when the surface shapes of the reflecting surfaces R4 and R6 and the concave lens R8 are measured. The center positions of the projections 53(c) and 53(d) respectively coincide with those of the projections 53(a) and 53(b). With this structure, the reference positions on the opposing reflecting surfaces agree with each other to measure the relative positions of the respective reflecting surfaces.

A flange portion 54 that differs in shape from the one in the first embodiment is also formed near the convex lens R1 on the light incident side. This flange portion 54 has flat portions 54(c) and 54(d) parallel to the above plane including the reference axis 5(b), and flat portions 54(a) and 54(b) perpendicular to the flat portions 54(c) and 54(d). The flat portion 54(a) has a projection 55(a) serving as a second reference portion. This projection 55(a) has a spherical distal end portion like the projections 53(a) and 53(b) described above, and serves as a reference for the absolute coordinate system of the optical element 51 when the reflecting surfaces R3, R5, and R7 are measured.

Similarly, a projection 55(b) serving as a second reference portion is formed on the flat portion 54(b) on the reverse side of the flange 54. This projection 55(b) serves as a reference for the absolute coordinate system when the reflecting surfaces R4 and R6 and the concave lens R8 are measured. The center position of the projection 55(b) coincides with that of the projection 55(a). With this structure, the reference positions on the opposing reflecting surfaces agree with each other to measure the relative positions of the respective reflecting surfaces.

As described above, in this embodiment, the projections 53(a), 53(b), and 55(a) formed on the flat portions 52(a) and 54(a) of the flange portions 52 and 54, together with the projections 53(c), 53(d), and 55(b) formed on the flat portions 52(b) and 54(b), serve as the second reference potions for defining the reference position of the optical element 51 as a whole in shape measurement.

Figure 9A:
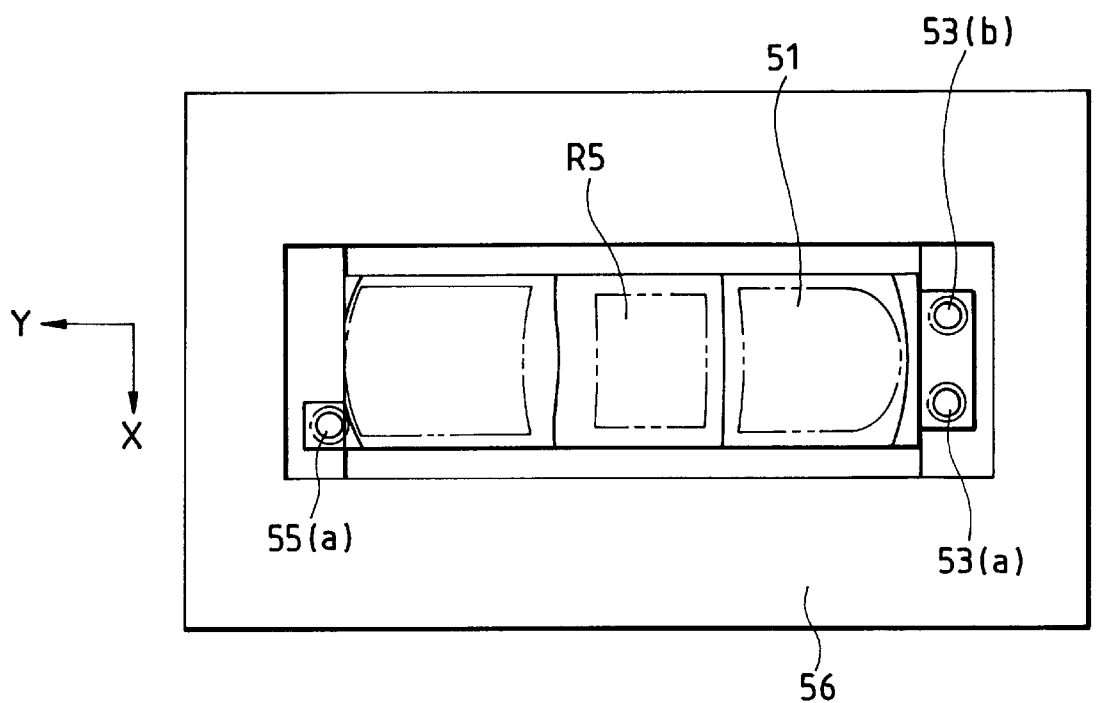
FIGS. 9A and 9B are views for explaining how the optical element according to the second embodiment is mounted on the holding jig, and is measured by a three-dimensional measuring device.
Figure 9B:
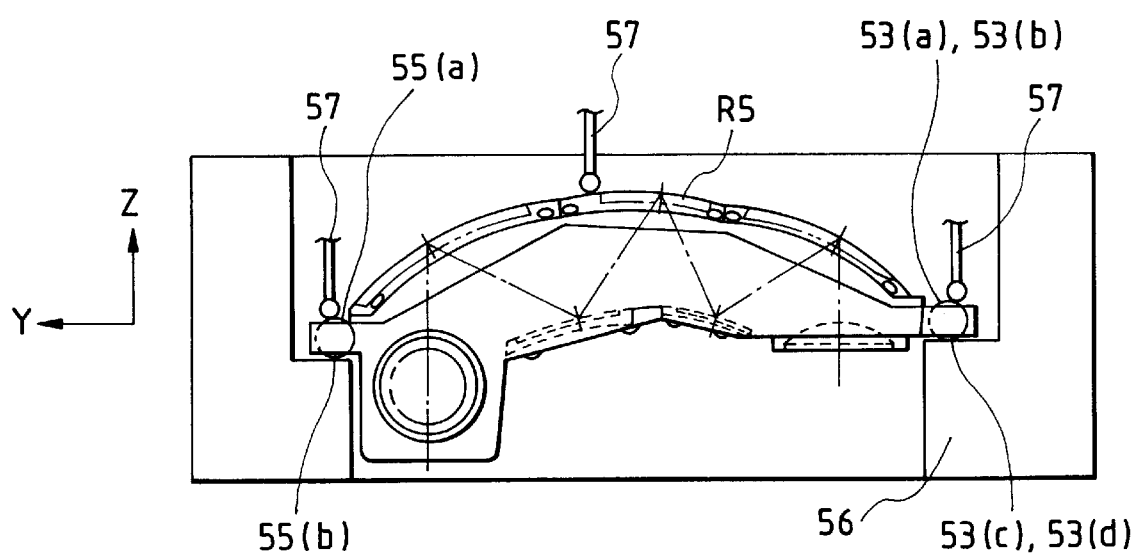

FIGS. 9A and 9B show a state in which the optical element 51 is mounted on a holding jig 56, and measurement is performed by a three-dimensional measuring device. FIG. 9A shows the optical element 51 when viewed from the reflecting surface R3/R5/R7 side. FIG. 9B is a side view of the optical element 51. Since the respective reflecting surfaces R3 to R7 and the refracting surface R8 are measured by basically the same method, only the reflecting surface R5 will be described as a representative example.

First of all, the shape of the projection 55(a) of the optical element 51 attached to the holding jig 56 is measured by a contact 57 of a three-dimensional measuring device to obtain a virtual center position. The projections 53(a) and 53(b) are also measured in the same manner as described above to obtain virtual center positions. The plane defined by the above three points is set as a reference plane, and the virtual center position of the projection 53(a) is set as the origin of the absolute coordinate system. While the origin of the absolute coordinate system is set, the contact 57 is moved to measure the shape of the reflecting surface R5. With the above process, the absolute position of the reflecting surface R5 is measured. The reflecting surfaces R3 and R7 can be measured in the same manner as described above.

Since the measurement reference portions (absolute coordinate system), i.e., the projections 53(a), 53(b), 55(a), 53(c), 53(d), and 55(b) for defining the reference position of the overall optical element 51 when the shape of the optical element 51 is measured, are formed on portions of the outer surface of the optical element 51 in this manner, the shapes of the reflecting surfaces R3 to R7 and the refracting surface R8 can be measured with high precision independently of the working precision of the holding jig 16.

In this embodiment, the local reference portions (projections 11 to 15) are formed outside the effective light beam reflecting regions of the respective reflecting surfaces as in the first embodiment. With this structure, the tilts, positions, and the like of the reflecting surfaces R3 to R7 can be easily measured within a short period of time by only measuring the local reference portions without sampling all the surface shapes of the reflecting surfaces R3 to R7.

In addition, the projections 53(a), 53(b), 55(a), 53(c), 53(d), and 55(b) as the measurement reference portions can also be formed with a very simple mold structure by insert-molding steel balls with high spherical degree precision and high diameter precision in the molding process for the optical element 51. As a material used for this insert molding, a material having hardness higher than that of the contact of the three-dimensional measuring device is preferably used in consideration of measurement reliability. In general, a metal material is suitably used. However, the present invention is not limited to this. For example, a glass, ceramic, or engineering plastic material that has high hardness and a softening point higher than that of a base material (low-moisture-absorption PMMA in this embodiment) may be used.

As described above, according to the optical element of this embodiment, the first reference portions (projections 11 to 15) for defining the reference positions of the reflecting surfaces R3 to R7 shape measurement of the optical element are formed outside the effective light beam reflecting regions of the reflecting surfaces R3 to R7, and the first reference portions are measured. With this operation, the relative positional relationship between the reflecting surfaces can be accurately calculated within a short period of time.

With the formation of the first reference portions on the reflecting surfaces R3 to R7, the relative positional relationship between the respective reflecting surfaces can be accurately measured.

By forming at least the three first reference portions, the relative positional relationship between the respective reflecting surfaces can be accurately measured.

By forming projections as the first reference portions, measurement is facilitated, and excellent workability in the mold work can be obtained.

By forming recesses as the first reference portions, a compact optical element can be realized.

When the distal end portions of the projections as the first reference portions in the form of projections are formed into spherical portions, measurement is facilitated, and excellent workability in the mold work can be obtained.

When the distal end portions of the projections as the first reference portions in the form of recesses are formed into spherical portions, a compact optical element that facilitates measurement, and allows excellent workability in the mold work can be obtained.

In addition, the second reference portions (projections 53(*a*), 53(*b*), 55(*a*), 53(*c*), 53(*d*), and 55(*b*)) for defining the reference position of the overall optical element are formed on portions of the outer surface of the transparent member forming the optical element, in addition to the first reference portions outside the effective light beam reflecting regions of the reflecting surfaces R3 to R7, and the first and second reference portions are measured. With this structure and operation, the relative positional relationship between the reflecting surfaces and the overall optical element can be calculated within a short period of time.

By forming at least the three second reference portions on portions of the outer surface of the transparent member forming the optical element, the relative positional relationship between the reflecting surfaces and the overall optical element can be accurately calculated.

By forming projections as the second reference portions, measurement is facilitated, and excellent workability in the mold work can be obtained.

By forming recesses as the second reference portions, a compact optical element can be realized.

When the distal end portions of the projections as the second reference portions in the form of projections are formed into spherical portions, measurement is facilitated, and excellent workability in the mold work can be obtained.

When the distal end portions of the projections as the second reference portions in the form of recesses are formed into spherical portions, a compact optical element that facilitates measurement, and allows excellent workability in the mold work can be obtained.

When the spherical portions as the second reference portions formed on portions of the outer surface of the transparent member forming the optical element are integrally formed by insert molding, an optical element having accurate position references (measurement references) can be easily molded.

When the spherical insert members are formed by using steel balls or a material such as a glass or ceramic material which has high hardness and a high softening point, the reliability in shape measurement can be improved, and an inexpensive optical element can be formed.

As described above, an inexpensive, high-precision optical element that can shorten the time required for measurement can be provided.

In addition, when an image pickup apparatus is formed by using the above optical element, a product having an image pickup element with excellent optical characteristics can be provided.

What is claimed is:

1. An optical element comprising:
   a surface; and
   a plurality of reference portions indicating a reference position of a shape of said surface, said reference portions having a curved surface for defining a point corresponding to the reference position,
   wherein said surface is an aspheric surface, and
   wherein said curved surface is of a convex shape or concave shape with respect to said surface.

2. An element according to claim 1, wherein the curved surface of said reference portion is a spherical surface, and the point is located at a curvature center of the spherical surface.

3. An element according to claim 2, wherein the spherical surface is a convex surface.

4. An element according to claim 2, wherein the spherical surface is a concave surface.

5. An element according to claim 1, wherein the curved surface of said reference portion is a conical surface, and the point is located at a vertex of the conical surface.

6. An element according to claim 5, wherein the conical surface is a convex surface.

7. An element according to claim 5, wherein the conical surface is a concave surface.

8. An optical element comprising:
   a surface; and
   a plurality of reference portions indicating a reference position of a shape of said surface, said reference portions having a curved surface for defining a point corresponding to the reference position,
   wherein said surface is on a surface of a transparent medium, and
   wherein said curved surface is of a convex shape or concave shape with respect to said surface.

9. An element according to claim 8 wherein said surface is formed as a reflecting surface on the surface of the medium, and reflects the light propagating in the medium.

10. An element according to claim 9, wherein a plurality of reflecting surfaces are formed on the surface of the medium.

11. An element according to claim 9, wherein said surface is a non-rotation-symmetrical, aspheric surface.

12. An element according to claim 11, wherein a plurality of surfaces are formed on the surface of the medium.

13. An element according to claim 12, wherein a light incident surface of the medium is a curved surface.

14. An element according to claim 12, wherein a light exit surface of the medium is a curved surface.

15. An element according to claim 12, wherein light incident and exit surfaces of the medium are curved surfaces.

16. An element according to claim 12, wherein the reference portion comprises a plurality of reference portions separately provided for the plurality of surfaces.

17. An element according to claim 16, wherein the reference portion comprises a plurality of reference portions provided for each of the plurality of surfaces.

18. An element according to claim 12, further comprising a second reference portion indicating a reference position of the shape of said element.

19. An element according to claim 18, wherein said second reference portion has a spherical surface, and the curvature center of the spherical surface corresponds to the reference position.

20. An element according to claim 19, wherein the spherical surface is convex.

21. An element according to claim 19, wherein the spherical surface is concave.

22. An element according to claim 19, wherein said second reference portion is made of a steel ball or a glass or ceramic ball.

23. An element according to claim 22, wherein said surface and said reference portion are integrally formed, and said second reference portion is formed by insert molding.

24. An element according to claim 12, wherein said surface and said reference portion are integrally formed.

25. An element according to claim 1, wherein said surface and said reference portion are integrally formed.

26. An element according to claim 8, wherein said element is made of a glass or plastic material.

27. A jig for holding said element defined by any one of claims 1 to 7 and claims 8 to 26 when a shape of said surface is to be measured, comprising a reference portion indicating a reference position of said jig.

28. A jig according to claim 27, wherein said reference portion is made of a steel ball.

29. An apparatus comprising said optical element defined by any one of claims 1 to 7 and claims 8 to 26.

30. An apparatus according to claim 29, wherein said apparatus is an image pickup apparatus.

31. An apparatus according to claim 29, wherein said apparatus is a display apparatus.

32. An optical element comprising:

a surface; and a reference portion indicating a reference position of a shape of said element, said reference portion being a portion to be held when said element is built in an apparatus, wherein said reference portion comprises a collar portion formed on said element, wherein said surface is on a surface of a transparent medium, and wherein said surface is formed as a reflecting surface on the surface of the medium, and reflects the light propagating in the medium.

33. An element according to claim 32, wherein a plurality of reflecting surfaces are formed on the surface of the medium.

34. An element according to claim 32, wherein said surface is a non-rotation-symmetrical, aspheric surface.

35. An element according to claim 34, wherein a plurality of surfaces are formed on the surface of the medium.

36. An element according to claim 34, wherein a light incident surface of the medium is a curved surface.

37. An element according to claim 34, wherein a light exit surface of the medium is a curved surface.

38. An element according to claim wherein light incident and exit surfaces of the medium are curved surfaces.

39. An element according to claim 34, wherein said reference portion comprises a plurality of reference portions.

40. An element according to claim 32, further comprising a reference position indicating a reference position of a shape of said surface.

41. A jig for holding said element defined by any one of claims 32 to 40 when the shape of said surface is to be measured, comprising a reference portion indicating a reference position of said jig.

42. A jig according to claim 41, wherein said reference portion is made of a steel ball.

43. An apparatus comprising said optical element defined by any one of claims 32 to 40.

44. An apparatus according to claim 43, wherein said apparatus is an image pickup apparatus.

45. An apparatus according to claim 43, wherein said apparatus is a display apparatus.

46. An element according to claim 32, wherein said surface is an aspheric surface.

* * * * *

UNITED STATES PATENT AND TRADEMARK OFFICE
CERTIFICATE OF CORRECTION

PATENT NO. : 6,337,773 B1  
DATED : January 8, 2002  
INVENTOR(S) : Kenji Kawano et al.

It is certified that error appears in the above-identified patent and that said Letters Patent is hereby corrected as shown below:

<u>Title page,</u>  
Item [56], References Cited, FOREIGN PATENT DOCUMENTS: "8-292374" should read -- 8-292372 --.

<u>Column 3,</u>  
Line 23, "headnor" should read -- head- or --.

<u>Column 7,</u>  
Line 3, "extended" should read -- extended- --.  
Line 44, "reference" should read -- reference to --.

<u>Column 14,</u>  
Line 34, "claim 8" should read -- claim 8, --.

<u>Column 15,</u>  
Line 11, "claim 8" should read -- claim 25 --.  
Line 14, "claims 1 to 7 and claims 8 to 26" should read -- claims 1 to 26 --.  
Line 20, "claims 1 to 7 and claims 8 to 26" should read -- claims 1 to 26 --.

<u>Column 16,</u>  
Line 15, "claim" should read -- claim 34, --.

Signed and Sealed this

Eighth Day of October, 2002

Attest:

*Attesting Officer*

JAMES E. ROGAN  
*Director of the United States Patent and Trademark Office*